United States Patent
Tzur et al.

(10) Patent No.: US 10,237,528 B2
(45) Date of Patent: Mar. 19, 2019

(54) SYSTEM AND METHOD FOR REAL TIME 2D TO 3D CONVERSION OF A VIDEO IN A DIGITAL CAMERA

(71) Applicant: QUALCOMM Incorporated, San Diego, CA (US)

(72) Inventors: Meir Tzur, Haifa (IL); Noam Levy, Karmiel (IL)

(73) Assignee: QUALCOMM Incorporated, San Diego, CA (US)

( * ) Notice: Subject to any disclaimer, the term of this patent is extended or adjusted under 35 U.S.C. 154(b) by 731 days.

(21) Appl. No.: 13/828,226

(22) Filed: Mar. 14, 2013

(65) Prior Publication Data

US 2014/0267602 A1 Sep. 18, 2014

(51) Int. Cl.
*H04N 13/00* (2018.01)
*H04N 13/02* (2006.01)
*H04N 13/04* (2006.01)

(52) U.S. Cl.
CPC ..... *H04N 13/0018* (2013.01); *H04N 13/0022* (2013.01); *H04N 13/026* (2013.01); *H04N 13/0484* (2013.01); *H04N 2013/0081* (2013.01)

(58) Field of Classification Search
CPC ............ H04N 13/0022; H04N 13/0207; G06T 7/0065; G02B 27/0075
See application file for complete search history.

(56) References Cited

U.S. PATENT DOCUMENTS

| | | |
|---|---|---|
| 4,804,831 A | 2/1989 | Baba et al. |
| 4,933,700 A | 6/1990 | Ikeda et al. |
| 5,005,956 A | 4/1991 | Kaneda et al. |
| 5,070,353 A | 12/1991 | Komiya et al. |
| 5,144,357 A | 9/1992 | Ishida et al. |
| 5,148,209 A | 9/1992 | Subbarao |
| 5,151,609 A | 9/1992 | Nakagawa et al. |

(Continued)

FOREIGN PATENT DOCUMENTS

| | | |
|---|---|---|
| JP | S62284314 A | 12/1987 |
| JP | S63127217 A | 5/1988 |

(Continued)

OTHER PUBLICATIONS

A UK Search Report from Application No. GB1317905.6 searched on Mar. 17, 2014, 1 page.

(Continued)

*Primary Examiner* — Zhubing Ren
(74) *Attorney, Agent, or Firm* — Paradice and Li LLP

(57) ABSTRACT

Embodiments are directed towards enabling digital cameras to create a 3D view, which can be re-rendered onto any object within a scene, so that it is both in focus and a center of perspective, based on capturing a single set of multiple 2D images of the scene. From capturing a single set of 2D images for a scene, a depth map of the scene may be generated, and used to calculate principal depths, which are then used to capture an image focused at each of the principal depths. A correspondence between a 2D image of the scene and the principal depths are determined that corresponds to a specific principal depth. For different coordinates of the 2D image, different 3D views of the scene are created that are each focused at a principal dept that corresponds to the given coordinate.

21 Claims, 7 Drawing Sheets

(56) References Cited

U.S. PATENT DOCUMENTS

| | | | |
|---|---|---|---|
| 5,193,124 | A | 3/1993 | Subbarao |
| 5,231,443 | A | 7/1993 | Subbarao |
| 5,369,461 | A | 11/1994 | Hirasawa et al. |
| 5,475,429 | A | 12/1995 | Kodama |
| 5,793,900 | A | 8/1998 | Nourbakhsh et al. |
| 6,198,484 | B1 * | 3/2001 | Kameyama .................. 345/419 |
| 6,269,197 | B1 | 7/2001 | Wallack |
| 7,389,042 | B2 | 6/2008 | Lin et al. |
| 7,623,726 | B1 | 11/2009 | Georgiev |
| 7,664,315 | B2 * | 2/2010 | Woodfill et al. .............. 382/154 |
| 8,218,061 | B2 | 7/2012 | Baxansky |
| 8,542,313 | B2 | 9/2013 | Rapaport et al. |
| 8,644,697 | B1 | 2/2014 | Tzur et al. |
| 8,654,234 | B2 | 2/2014 | Hirsch et al. |
| 8,724,013 | B2 | 5/2014 | Safaee-Rad et al. |
| 2002/0018070 | A1 | 2/2002 | Lanier |
| 2003/0063815 | A1 | 4/2003 | Watanabe |
| 2004/0257464 | A1 | 12/2004 | Pandit et al. |
| 2005/0218231 | A1 | 10/2005 | Massieu |
| 2006/0181644 | A1 | 8/2006 | De Haan |
| 2007/0018977 | A1 | 1/2007 | Niem et al. |
| 2008/0075444 | A1 | 3/2008 | Subbarao et al. |
| 2008/0080852 | A1 | 4/2008 | Chen et al. |
| 2008/0095312 | A1 | 4/2008 | Rodenburg et al. |
| 2008/0131019 | A1 | 6/2008 | Ng |
| 2008/0211959 | A1 | 9/2008 | Balram et al. |
| 2008/0297648 | A1 | 12/2008 | Furuki et al. |
| 2009/0167930 | A1 * | 7/2009 | Safaee-Rad et al. ......... 348/347 |
| 2010/0165152 | A1 | 7/2010 | Lim |
| 2011/0007131 | A1 | 1/2011 | Okada et al. |
| 2011/0007176 | A1 | 1/2011 | Hamano |
| 2011/0025830 | A1 | 2/2011 | McNamer et al. |
| 2011/0109727 | A1 * | 5/2011 | Matsuura ........... H04N 5/23212 348/47 |
| 2011/0316968 | A1 | 12/2011 | Taguchi et al. |
| 2012/0019688 | A1 | 1/2012 | Bugnariu et al. |
| 2012/0070097 | A1 | 3/2012 | Adams, Jr. |
| 2012/0076369 | A1 | 3/2012 | Abramovich et al. |
| 2012/0120283 | A1 | 5/2012 | Capata et al. |
| 2012/0200726 | A1 | 8/2012 | Bugnariu |
| 2013/0010067 | A1 | 1/2013 | Veeraraghavan et al. |
| 2013/0044254 | A1 | 2/2013 | Tzur |

FOREIGN PATENT DOCUMENTS

| | | |
|---|---|---|
| KR | 20090037247 A | 4/2009 |
| WO | WO-2007/024709 A3 | 3/2007 |
| WO | WO-2009073950 A1 | 6/2009 |

OTHER PUBLICATIONS

Pentland A.P., "A new sense for depth of field", IEEE Transactions on Pattern Analysis and Machine Intelligence, vol. PAMI-9, No. 4, pp. 523-531, Jul. 1987.

Asada N., et al., "Depth from Blur by Zooming", Proc. Vision Interface, 2001, pp. 165-172.

Bove Jr., V.M., et al., "Entropy-based Depth from Focus", J Optical Society of America, Apr. 1993, 10, pp. 561-566.

Gökstorp M: "Computing depth from out-of-focus blur using a local frequency representation" Pattern Recognition, 1994. vol. 1, Conference A: Computer Vision & Image Processing, Proceedings of the 12th IAPR International Conference on Jerusalem, Israel Oct. 9-13, 1994, Los Alamitos, CA, USA,IEEE Comput. Soc, vol. 1, Oct. 9, 1994 (Oct. 9, 1994), pp. 153-158, XP010215959.

Nayar S.K., et al., "Real-time Focus Range Sensor", IEEE Transactions on Pattern Analysis and Machine Intelligence, vol. 18, No. 12, 1996, pp. 1186-1198.

Pentland A.P., "A New Sense for Depth of Field", Proc. 9th International Joint Conference on Artificial Intelligence—IJCAI, 1985, pp. 988-994.

Sewlochan, Ray, "Iterative Depth from Defocus (I-DFD) Algorithms", The University of British Columbia, Apr. 1995 Thesis, 173 pages.

Subbarao M., et al., "Depth from Defocus: A Spatial Domain Approach", International Journal of Computer Vision, vol. 3, No. 3, 1994, pp. 271-294.

Subbarao M., et al., "Depth from Defocus and Rapid Autofocusing: A Practical Approach", International Proc. CVPR, 1992, pp. 773-776.

Subbarao M: "Parallel Depth Recovery by Changing Camera Parameters", 19881205; 19881205-19881208, Dec. 5, 1988 (Dec. 5, 1988), pp. 149-155, XP010225199.

Watanabe M., et al., "Rational Filters for Passive Depth from Defocus", International Journal of Computer Vision, vol. 27, No. 3, May 1998, 203-225.

Watanabe M., et al., "Real-time Computation of Depth from Defocus", Proc. of SPIE: Three Dimensional and Unconventional Imaging for Industrial Inspection and Metrology, 2599, A-03, Nov. 1995; 12 pages.

Xiong, Yalin et al., "Depth from Focusing and Defocusing," The Robotics Institute, Mar. 1993, pp. 1-23.

Ziou D., et al., "Depth from Defocus Estimation in Spatial Domain", Computer Vision and Image Understanding, vol. 81, No. 2, Feb. 2001, pp. 143-165.

* cited by examiner

SYSTEM AND METHOD FOR REAL TIME 2D TO 3D CONVERSION OF A VIDEO IN A DIGITAL CAMERA

TECHNICAL FIELD

The present embodiments relate generally to digital video and still image processing and, more particularly, but not exclusively, to at least using a digital camera to create a three-dimensional (3D) view that can be re-rendered onto different objects in a scene based on capturing two-dimensional (2D) images of the scene at principal depths.

BACKGROUND

For years, people have watched their digital images in a flat two-dimensional representation. While providing significant excitement, such displays have lacked the additional excitement that can be brought about by images that are displayed in three dimensions (3D). Recently, however, many manufacturers have been manufacturing 3D stereoscopic televisions, using a variety of techniques, including active or passive glasses, lenticular glasses-free displays, as well as a variety of other techniques, to project three dimensional images for viewing.

However, creating three dimensional images for display often involves recording of multiple images, one image or images for a right eye perspective, and another image or images for a left eye perspective. These two views are typically captured by specialized imaging systems often with dual cameras that may rotate inward, to simulate how a person's eyes might look towards an object. The two image views are then processed to create images that are perceived as three dimensional. Such post-processing is often complex and may involve significant computing resources. Moreover, such 3D images are often constrained to a single view perspective focused on a specific object. Thus, should a person seek another perspective view of the image focused at a different object, another set of images often must be captured and reprocessed. While providing three-dimensional content to the viewing public, such complexities have limited the ability for a typical consumer to produce their own three-dimensional images. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF THE EMBODIMENTS

Figure 1:
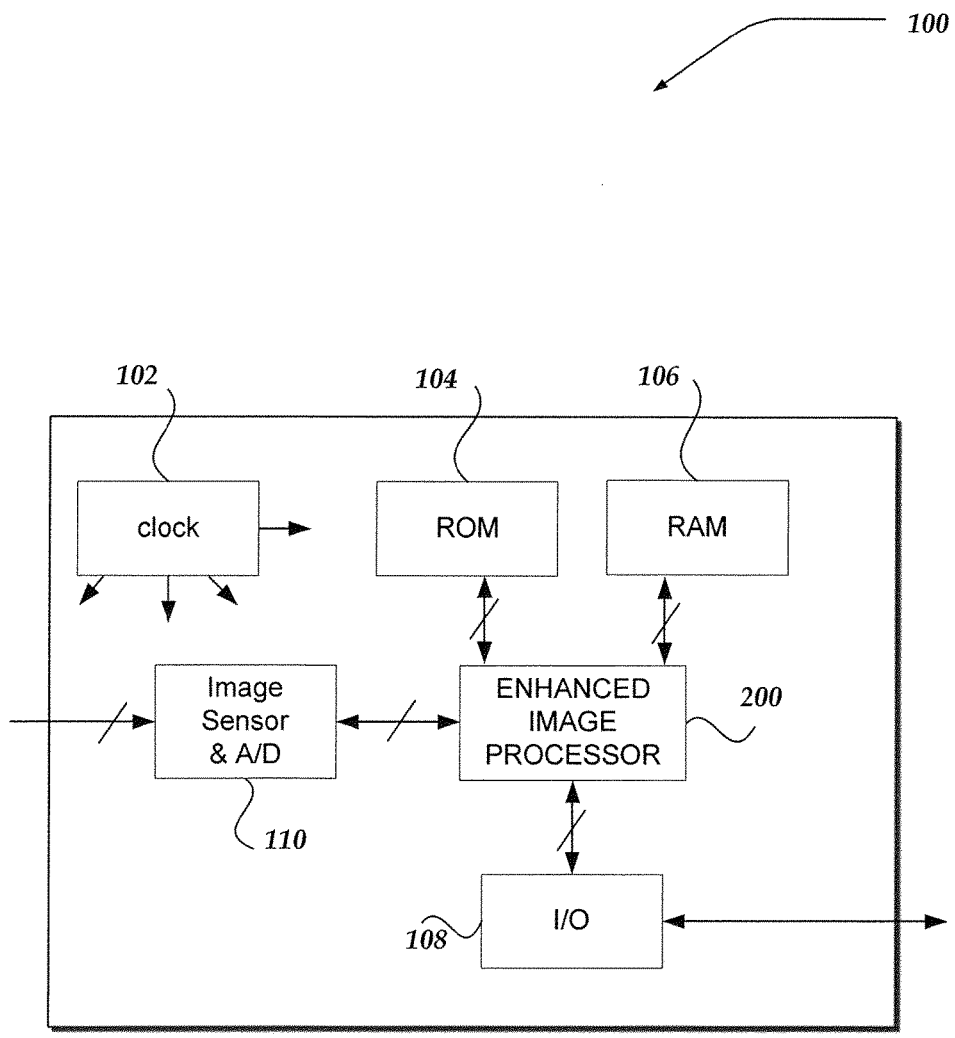
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time. As described herein such two dimensional images are dynamically converted in real time to three dimensional images, wherein the images that are converted may also represent a sequence of images comprising multiple video frames in a video stream.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards enabling handheld digital cameras or other devices to create a 3D view, which can be re-rendered onto any object within a scene, so that it is both in focus and a center of perspective, based on capturing 2D images of the scene at principal depths.

When viewing a real (3D) scene, an observer has the ability to direct a relative direction of a left and right eye, so as to put the object of interest in the center of both right and left eye retinas, and the ability to focus each eye on the object of interest. The focus and relative gaze direction of each eye is often used as an important depth cue. The disclosed invention therefore is directed towards using a monocular imaging device and a relatively small number of images, selected as those focused on principal depths, in order to create a plurality of different 3D views of the scene. In one embodiment the selected number of images may range between about three and ten. Other number of images may also be used. By selecting a small number of images, the embodiments herein need not capture images at all possible focus positions. Further, when a small number of images are captured, a time lag between the captured images is small and therefore enables fewer artifacts to occur when the images are combined for creating an all in focus image, or other processed image.

Initially, a set of pre-capture 2D images are obtained for a scene. From these pre-capture 2D images, a depth map of the scene may be generated. Additional ways for the creation of a depth map may use external rangefinder techniques. Using the depth map, principal depths are calculated, and used to capture an image focused at each of the principal depths. A correspondence between a 2D image of the scene and the principal depths are determined such that each coordinate of the 2D image corresponds to a specific principal depth. Then, for a given coordinate of the 2D image, a 3D view of the scene is created that is focused at that principal depth that corresponds to the given coordinate. Different given coordinates of the 2D image may be repeatedly selected to create different 3D views of the scene absent taking of another set of 2D images. In some embodiments, the different given coordinates may be obtained based on a user input selection device, capturing a user's eye gaze, or the like. In this way, changing 3D views may be created according to a change in a user's eye gaze onto the scene.

Illustrative Operating Environments

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to capture and process images. In one embodiment, system 100 may include components not shown, such as a lens or other optical elements, and image sensor(s) for receiving images that may be converted into a digital image for processing and subsequent storage within one or more storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Image Processor (EIP) 200, or the like.

Also shown is a volatile random-access memory (RAM) circuit chip 106 that may be coupled to EIP 200 to provide temporary data storage. In one embodiment, RAM 106 may be configured to receive and store image data for use by EIP 200 or output data from EIP 200, as well as to store depth map data, principal depth data, various algorithms, and the like. A separate nonvolatile read-only memory (ROM) memory chip 104 is also coupled to EIP 200 and may be employed for storage of a processor program, calibration data, look-up tables (LUTS), non-linear functions, and a variety of other data useable by system 100. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EIP 200 may be configured to receive one or more frames of image data, operate upon the received two dimensional image data to create three dimensional image data, compress the three dimensional image data, and store or otherwise send resulting compressed (encoded) data using a variety of storage devices, and/or communication mechanisms, and therefore is not limited to merely those described herein.

I/O device 108 includes circuitry for coupling system 100 to one or more external devices, networks or the like, and is constructed for use with one or more communication protocols and technologies, including any of a variety of communication protocols and technologies useable for communicating images, including images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand. In some embodiments, I/O device 108 may also be configured to operate in conjunction with various image capturing components to monitor a user's eye gaze on a displayed scene and to use the monitored eye gaze to select one or more regions of interest, based on where the monitored eye gaze is detected within the scene. For example, camera equipped devices, or the like, might be used to detect an eye gaze for the user. Then, the eye gaze position may be correlated to a region within the scene as displayed to the user through a display monitor, or other mechanism. When it is determined that the eyes have moved or changed where they are gazing within the scene, another region of interest may be identified. The one or more regions of interest may then be used to create a 3D view for a given region of interest, such that an object within the given region of interest is both in focus and a center of perspective. However, embodiments are not constrained to monitoring eye gaze, and other forms of input, including a user selection mechanism, to identify a region of interest, usable about which to create a 3D view.

Also illustrated, is an image sensor & analog-to-digital converter (A/D) that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). Image sensor & A/D 110 may then provide the digital data to EIP 200 for processing. In one embodiment, the data received by EIP 200 may be in a raw Bayer format. However, other data formats may also be used, including, for example, the image data may be defined by three components of the image signal; namely, a luminance component (Y), and two complementary chrominance (color differences) components (V=R−Y) and (U=B−Y).

Figure 2:
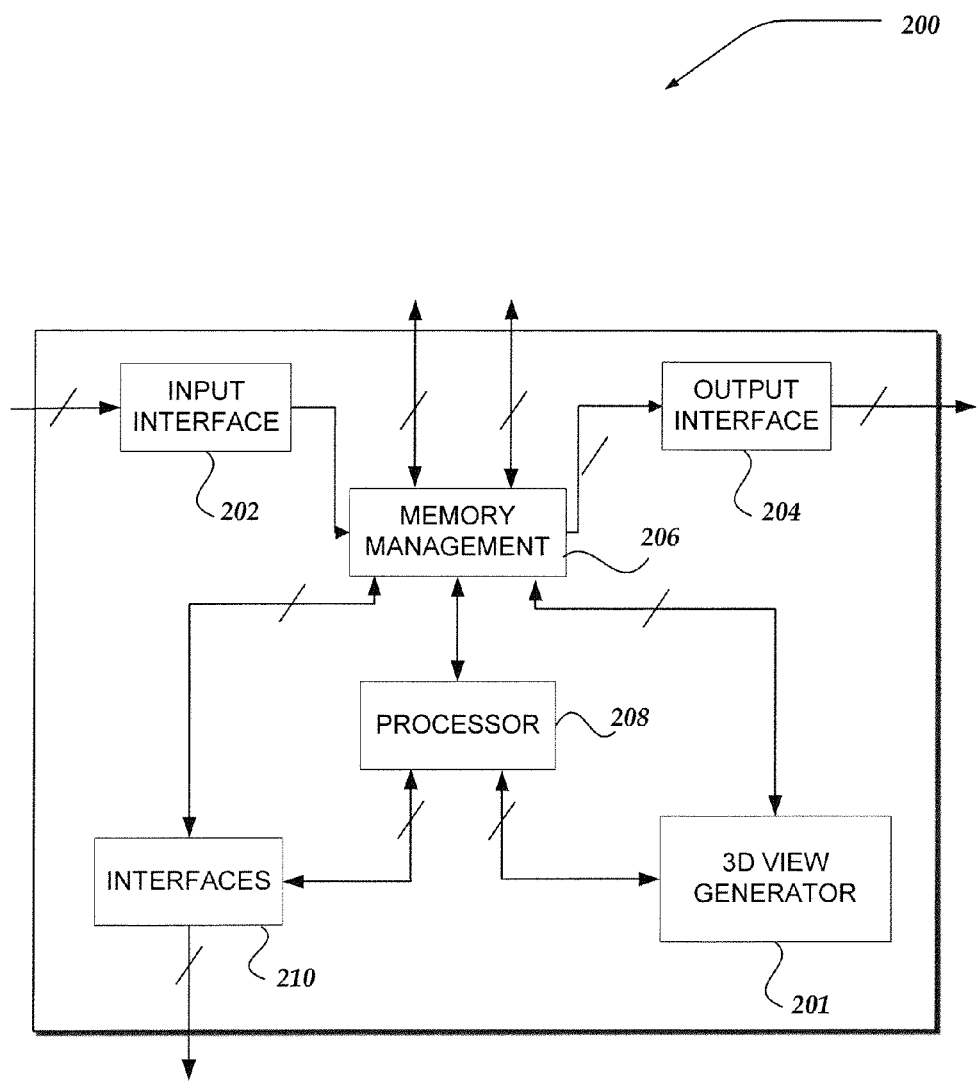
FIG. 2 shows one embodiment of an enhanced image processor usable for practicing various embodiments.

One embodiment of EIP 200 is shown in FIG. 2. EIP 200 may include many more or less components than those shown. The components shown, however, are sufficient to disclose an illustrative embodiment for practicing various embodiments.

As shown in FIG. 2, EIP 200 may include processor 208 that may represent a general purpose or a specialized central processing unit (CPU) that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more image frames may be received by input interface circuit 202 and communicated to other components by connection through memory management device 206. In one embodiment, 3D View Generator (3VG) 201 may be employed as described further below, to receive captured images in two dimensions for a given scene. A depth map is then created from the captured image data, and used to calculate a plurality of principal depths that represent depths in the scene determined to have importance based on a scene depth histogram or other cues. A depth from the plurality of principal depths is then associated to each coordinate of the 2D image of the scene. Then, from a determined region of interest for the scene, a 3D view of the scene is created that is focused at the principal depth that corresponds to coordinates for the region of interest. The 3D image view may then be encoded as a compressed bit-stream representing the three dimensional image that may be output through output interface circuit 204 to various memory storage devices, or even over a network, including, a wireless and/or wired network, to another device.

Interfaces 210 may provide for various mechanisms to communicate with processor 208 and/or memory management 206, other components, to enable modifications to various actions, provide status of an action, or the like by another device, an end-user, or the like.

As discussed further below, however, in some embodiments, the 2D image data might be captured using various digital image capture devices, including system 100 of FIG. 1, and provided to a different computing device for post-processing to generate the 3D images.

Figure 3:
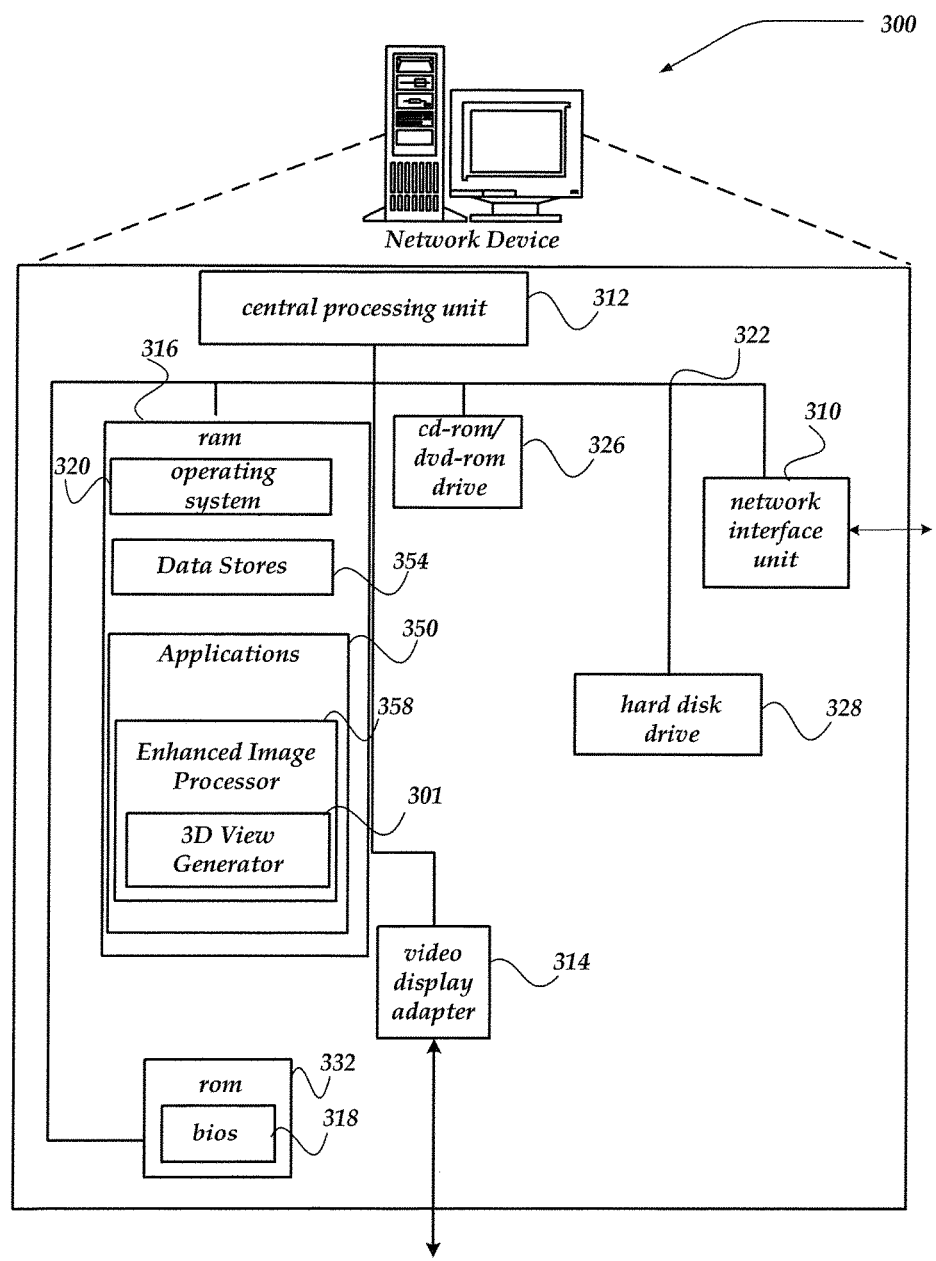
FIG. 3 illustrates a system diagram of another embodiment of computing device in which the embodiments may be practiced.

FIG. 3 shows one embodiment of another device useable with another embodiment of the EIP. Network device 300 may include many more or less components than those shown. The components shown, however, are sufficient to disclose an illustrative embodiment for practicing the invention. Network device 300 may represent any of a variety of computing devices, including, but not limited to personal computers, desktop computers, multiprocessor systems, microprocessor-based or programmable electronics, a rack mounted multi-processing configuration, network PCs, televisions, camera systems, server devices, network appliances, and the like. In one embodiment, network device 300 may also operate as a laptop computer, or similar handheld computer system. In at least one embodiment, network device 300 may include an image capturing component, such as a camera useable for capturing image data.

In one embodiment, while a single network device 300 is illustrated, operations discussed with respect to at least the EIP, may also be distributed across a plurality of computing devices, for example, such as might arise within a cloud architecture, a peer-to-peer structure, a cluster architecture, or other distributed architectures.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, compact-disc read only memory (CD-ROM)/digital versatile disc-ROM (DVD-ROM) drive 326, and/or floppy disk drive. The mass memory stores operating system 320 for controlling the operation of network device 300. Any general-purpose operating system or special purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Moreover, in at least one embodiment, Network interface unit 310 may be configured to interface with an image capturing component, such as a camera, lens assembly, or the like, such as disclosed above in conjunction with FIG. 1.

The mass memory as described above illustrates another type of computer-readable or processor-readable device, namely non-transitory computer-readable storage media. Computer-readable storage media (devices) may include volatile, nonvolatile, non-transitory, removable, and non-removable media implemented in any method or technology for storage of information, such as computer readable instructions, data structures, program modules, or other data. Examples of non-transitory computer-readable storage media include RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other physical non-transitory medium which can be used to store the desired information and which can be accessed by a computing device.

As shown, data stores 354 may include a database, text, spreadsheet, folder, file, or the like, that may be configured to maintain and store data useable for 3D View Generator 301, including, focus range data, threshold data, function look-ups, tables, image data, and/or any of a variety of data useable within one or more of the processes discussed below. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, customizable user interface programs, security programs, and so forth. Memory may also include EIP 358 which may further include 3D View Generator 301. It should be recognized that while EIP 358 and 3D View Generator 301 are illustrated within RAM 316, other embodiments may include EIP 358 and/or 3D View Generator 301 within ROM 332, and/or within one or more separate circuit boards (not shown) within network device 300.

EIP 358 and 3D View Generator 301 operate substantially similar to EIP 200 and 3D View Generator 201 of FIGS. 1-2, respectively, to provide generated multiple 3D views of a given scene by processing captured multiple 2D images of the scene, as described in more detail below.

It should be recognized that EIP 358 and 3D View Generator 301 may operate on image data obtained from data stores 354, hard disk drive 328, cd-rom/dvd-rom drive 326, other storage devices, or even from a network or from another device through network interface unit 310, as well as from various image sensing devices, or the like.

Generalized Operation

Figure 4:
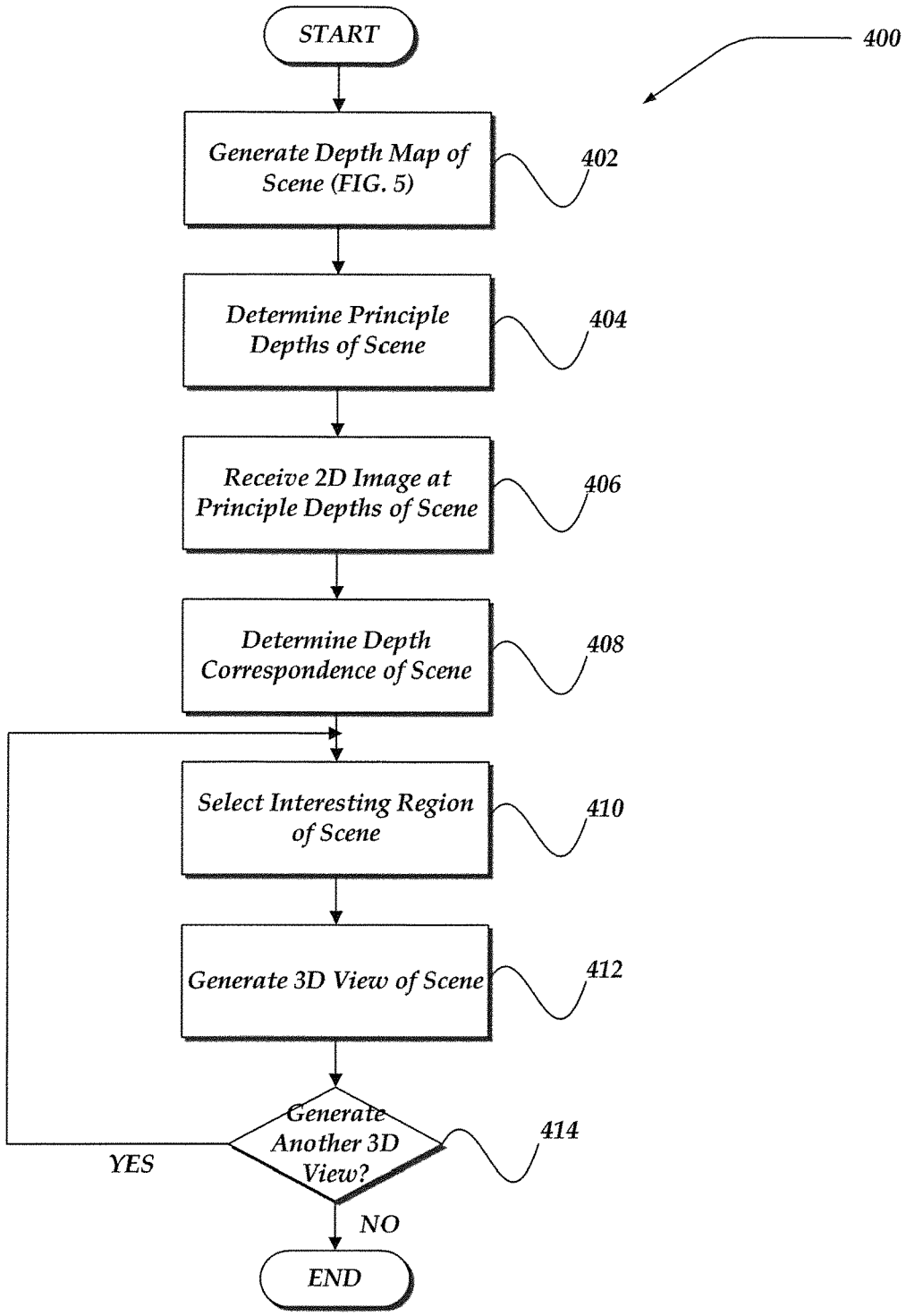
FIG. 4 illustrates one embodiment of process flow usable to create multiple three dimensional (3D) views of a scene.

The operation of certain aspects of the invention will now be described with respect to FIGS. 4-7. FIG. 4 illustrates one embodiment of process flow usable to perform creation of multiple 3D views of a scene. Process 400 of FIG. 4 may be performed within various components of system 100 of FIG. 1, as discussed above, and/or within network device 300 of FIG. 3.

Briefly, process 400 is directed towards generating different 3D views of a given scene by capturing and processing multiple 2D images of the scene. Process 400 begins, after a start block, at block 402, where a depth map of a scene is generated based on captured images for the scene.

In one embodiment, the images might be obtained during a pre-capture mode. In one embodiment, this might arise, where an indication is received that a shutter button is half-pressed. However, other indicators may also be received, including from a switch, a code option having been set, or the like. In such instances, pre-capture images are obtained for the scene.

Generating the depth map from pre-capture image data may be performed using any of a variety of techniques. For example, in one embodiment, a depth from focus (DFF) technique may be employed to generate a depth map by capturing images at all possible focus positions, calculating a focus measure and finding the location of the maximum focus measure at each coordinate of the 2D image. A depth associated with a particular coordinate of the 2D image may then be determined based on the maximum focus measure associated with the coordinate.

In another embodiment, a depth map may be generated using depth from defocus (DFD) technique. Briefly, DFD is a technique that estimates the depth map of a scene from a set of two or more images of the scene taken from a same point of view. In one embodiment, the set of images may be pre-capture images. The images are obtained by varying camera parameters (typically a focus position, and/or aperture size/iris). The information about the distance to an object in the scene is contained in a blur quantification of the defocused images.

Various techniques to determine depths from the blur quantification are discussed in "Apparatus, Method, and Manufacture For Iterative Auto-Focus Using Depth-From-Defocus", U.S. Pat. No. 8,218,061, which is herein incorporated in its entirety by reference. Other techniques usable to determine depths from the blur quantification are discussed in "Depth From Defocus Calibration", U.S. Patent Pub. No.: 2011/0181770, which is also incorporated herein in its entirety by reference. One technique for progressively determining depth from defocused images to generate a depth map is discussed in more detail below in conjunction with FIG. 5.

In any event, a depth map is generated at block 402 based on an initial capture of 2D images for the scene or by additional ways that use external rangefinder techniques that are not necessarily part of the camera focusing mechanism Processing then flows to block 404.

At block 404, principle depths of the scene are determined. Principle depths generally represent depths that are considered to be important depths in the scene. In some embodiments, such determination may be based on scene depth histograms and/or from other cues based on the depth map. Any of a variety of techniques may be used therefore to identity principle depths of the scene. For example, various techniques to determine principle depths of a scene are discussed in "Image Capture For Later Refocusing or Focus-Manipulation", U.S. Patent Publication No.: 2013/0044254, which is herein incorporated in its entirety by reference. One technique for determining principle depths based on the depth map is discussed in more detail below in conjunction with FIG. 6.

Process 400 then flows to block 406, where 2D image data of the scene is captured at each of the determined principle depths. That is, using the principle depths to identify particular focus positions, a 2D image is captured at each of the focus positions. In some embodiments, a typical number of focus positions used to capture the images may range between about four to about ten. However, more or less focus positions may be used. In any event a small number of 2D images may be captured at block 406.

Moving next to block 408, a calculation is performed to obtain a correspondence between a 2D image of the scene, captured at block 406, and the principal depths. A depth from the set of principle depths is associated to each coordinate of the 2D image data captured at each of the principle depths. This can be achieved by going over all the coordinates and finding the principle depth that is closest to an actual depth of the coordinate, as previously determined at block 402.

Flowing next to block 410, an interesting region is selected. In one embodiment the interesting region represents a region within the scene in which a user's eye gaze might be directed towards. Selection of such regions provides for different 3D view perspectives being generated as described further below. The interesting region might be selected or otherwise identified using any of a variety of techniques. For example, in some embodiments, a device might be employed to track an eye gaze position onto the scene. When an eye gaze is detected for a given time period that position within the scene where the eye gaze is located upon may then be used as the interesting region. Automatic devices that detect an eye gaze may further be used to create an illusion of a moving 3D perspective, where the scene and the 3D view is adjusted according to the user's gaze, so that the 3D perception might be maximized.

However, other techniques may be used, including receiving an input from an input selection device, such as a mouse, icon, pointer, or the like, that identifies a region within the scene to be the interesting region.

Moreover, a region may comprise a plurality of pixels identified based on an object within the scene, or based on some other criteria. For example, a region might be defined as a number of pixels about a particular center pixel of the 'region' of interest.

Moving next to block 412, a 3D view of the scene is generated, focused on the interesting region of the scene. Having the interesting region, a corresponding principal depth for is found. From this information a stereoscopic pair of images may be generated that provide for a synthetic 3D image.

In one embodiment, to generate the synthetic 3D view, an image taken from the perspective of the user's left eye and directed and focused at the interesting region is generated. Another corresponding image taken from the perspective of the user's right eye and directed and focused at the interesting region is also generated.

Figure 7:
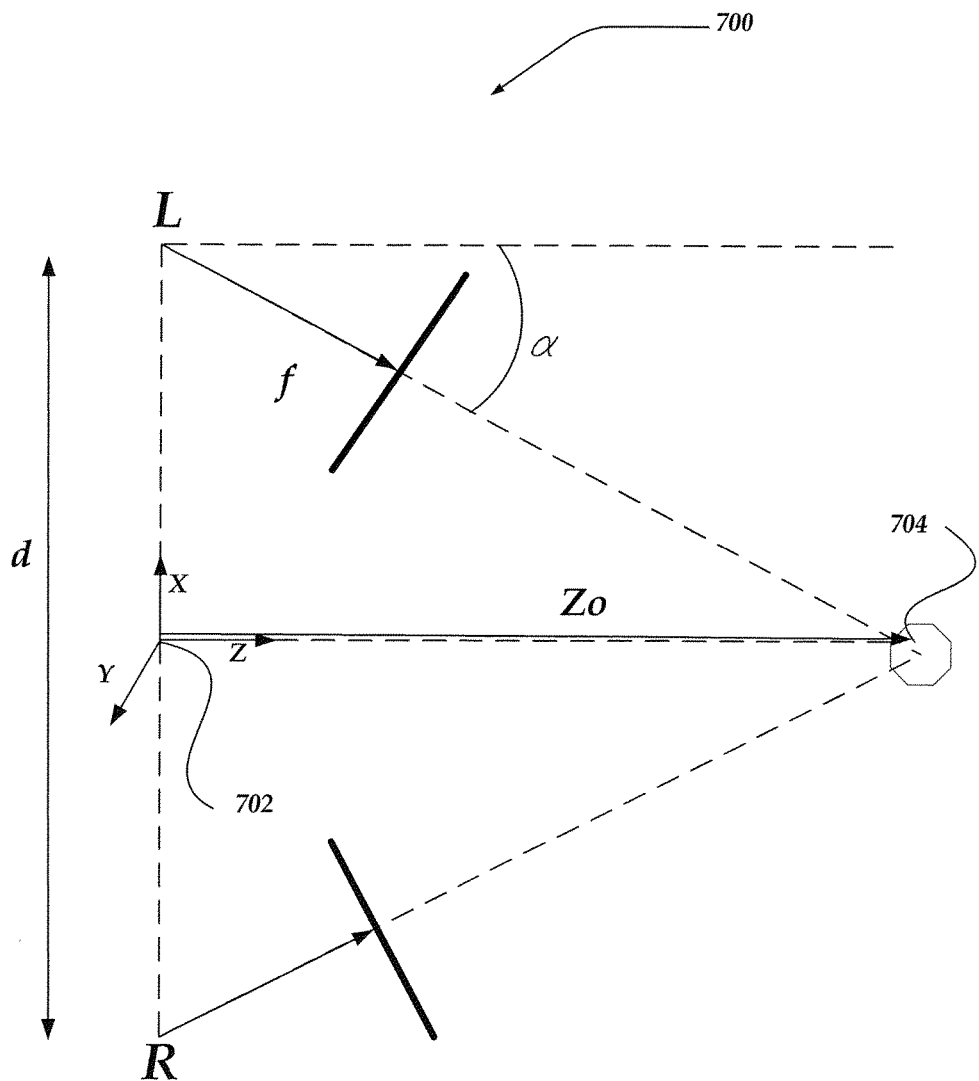
FIG. 7 illustrates one non-limiting, non-exhaustive example of a real and imaginary camera model usable to disclose various aspects of the subject innovations as discussed herein.

References to FIG. 7 are used to illustrate the generation of the left and right eye images. FIG. 7 illustrates one non-limiting, non-exhaustive example of a real and imaginary camera model usable to disclose various aspects of the subject innovations. More or less components may be shown in FIG. 7; however, those shown are sufficient to describe the following actions.

Reference 700 of FIG. 7 illustrates position 702 as a camera position for capturing of the 2D image. Location 704 represents a region of interest. To obtain the synthetic 3D view, an imaginary camera may be positioned at each of the left and right eye positions, separated by a baseline distance d. The 2D image data received at block 406 is captured with the camera positions at the origin of the xyz axis in FIG. 7, position 702. The position may then be translated and rotated to position the imaginary cameras, so that the left and right imaginary cameras are located at positions L and R, respectively, and facing the object of interest. In order to create a synthetic view for the left eye and a synthetic view for the right eye, image data taken with the real camera is translated and rotated. The angle each imaginary camera is rotated, in the X-Z plane is a, where a arctan $(d/(2Z_o))$, and Zo is the distance to principle depth of interest at the interesting region 704.

The rotation for the left eye imaginary camera can be accomplished with the following rotation matrix, R.

$$R = \begin{bmatrix} \cos\alpha & 0 & \sin\alpha & 0 \\ 0 & 1 & 0 & 0 \\ -\sin\alpha & 0 & \cos\alpha & 0 \\ 0 & 0 & 0 & 1 \end{bmatrix}$$

The translation for the left eye imaginary camera can be accomplished with the following translation matrix, T.

$$T = \begin{bmatrix} 1 & 0 & 0 & d/2 \\ 0 & 1 & 0 & 0 \\ 0 & 0 & 1 & 0 \\ 0 & 0 & 0 & 1 \end{bmatrix}$$

Each point in the image has a 3 coordinate description (x,y,z), where z is the value from the depth map generated above, at block 402. The real-world coordinates of each point relative to the left imaginary camera position are.

$$[x_L y_L z_L 1]^T = RT[xyz1]^T$$

Accordingly, the coordinates on the left image plane are given by:

$$x_L^p = f \frac{x_L}{z_L}$$

$$y_L^p = f \frac{y_L}{z_L},$$

where f is the focal length of the imaginary camera and can be treated as a parameter in process 400.

The case for the right imaginary camera is similar, except the camera is rotated and translated in the opposite direction.

$$[x_R y_R z_R 1]^T = R^{-1} T^{-1} [xyz1]^T$$

This provides a mapping for each pixel, depth pair from the original image to the left and right synthetic images. Based on this mapping, the right and left synthetic images are generated for the given region of interest. The result may then be used to display a 3D view based on the region of interest.

Processing then flows to decision block 414, where a determination is made whether to generate another 3D view of the scene for a different region of interest. In this way multiple 3D views may be quickly generated without having to perform recaptures of images for different regions of interests. Thus, if another 3D view is to be generated, processing branches back to block 410, where another region of interest is obtained, and then to block 412, where the above disclosed rotations and translations are performed for 2D for a given principal depth that corresponds to the coordinates associated with the other region of interest. If another 3D image view is not to be generated, then processing may end.

As disclosed above, a relatively small number of images, those focused on the principal depths are used to create various 3D views of the scene. Moreover, once the principal depths of the scene are obtained, changing 3D views for different regions of interests may be quickly obtained by performing translation and rotation mappings for each pixel in the scene.

As discussed above, the stereoscopic synthetic image pair may be generated by choosing the image which contains the object of interest in maximum focus. This image was captured at block 406, when the camera was focused on the principal depth that corresponds to the region of interest. The above actions then are used to warp this image to left and right images at block 412.

However, an alternative approach would be to use the depth information and a multitude of images captured to generate an image with an increase depth-of-field, for example, an all in focus image. This could be done by generating a new (all in focus) image to be used as a reference image in the 3D view generation process. Such an image can be created by selecting each pixel from the image (captured at block 406) in which the region around the pixel is maximally in focus.

In other embodiments, the above process flow might be varied where capturing a stereoscopic image is possible for the image capture device. Some image capture devices may be equipped with two lenses and can therefore capture a stereoscopic image (e.g., capture two images of left and right views simultaneously). If such an image capture device is used, then the flow of process 400 might be simplified. That is, the capturing will be of a stereoscopic image and the generation of the 3D for different regions of interest would then include the rotations of the left and right images. The other actions of process 400 would be similar.

Figure 5:
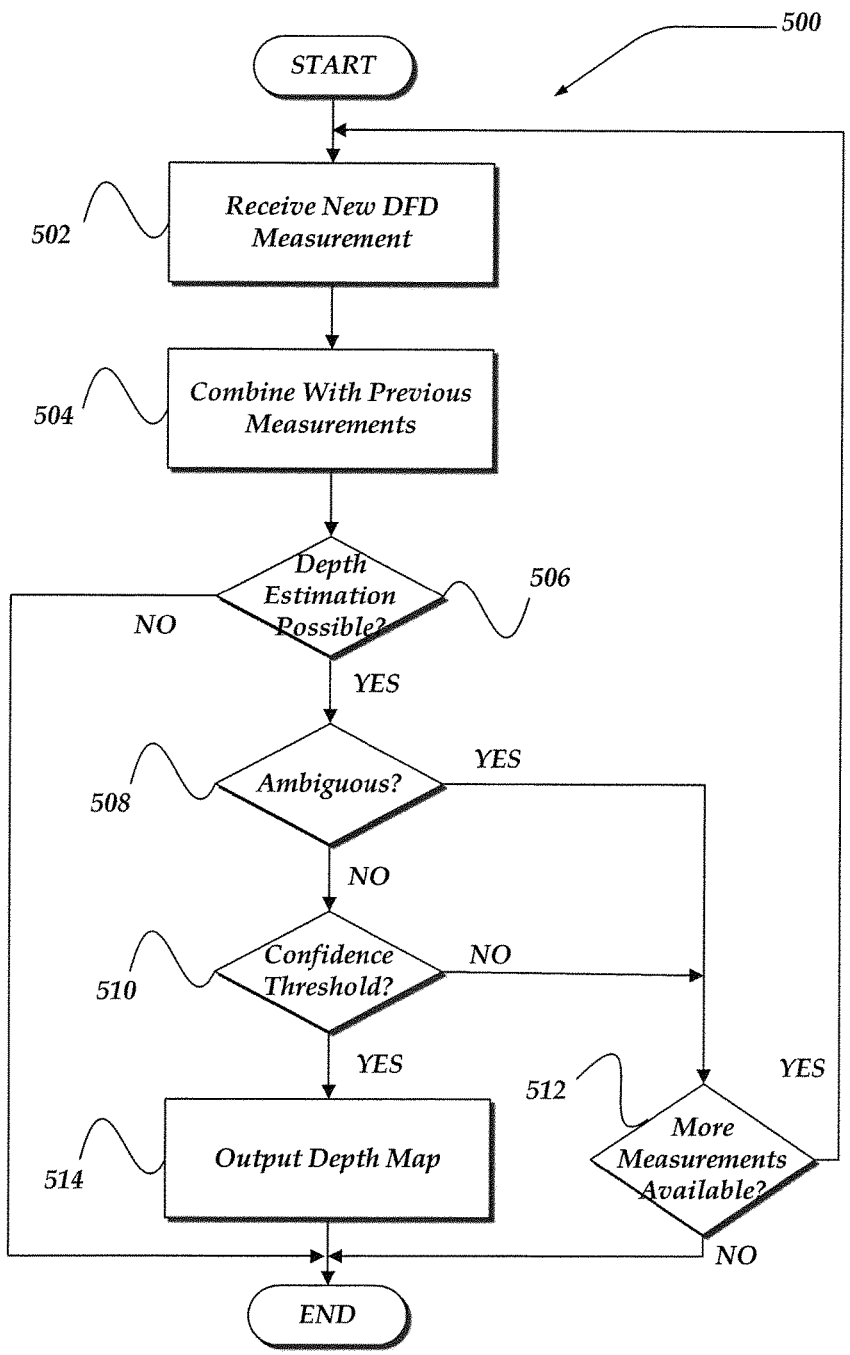
FIG. 5 illustrates one embodiment of process flow usable within the process of FIG. 4 to generate a depth map using Depth From Defocus.

FIG. 5 illustrates one embodiment of a process flow usable within block 402 of FIG. 4 to generate a depth map using Depth From Defocus (DFD). While process 500 of FIG. 5 illustrates one embodiment usable at block 402, other processes may also be used. In any event, process 500 is an example of a DFD method for progressively/iteratively determining depth from defocused images, useable to generate a depth map of a scene.

Process 500 begins, after a start block, at block 502, where a DFD depth measurement is received. In one embodiment, at least two images of the scene are captured and provided at block 502. When capturing the images, settings of the camera such as focus, aperture size, or the like, may be varied between the at least two images. As noted above, information about a distance to an object in the scene, or depth, is obtained from a blur quantification of the defocused images in the scene. That is, an amount of blur in an object may be directly correlated with the depth. In some embodiments, statistical methods may be employed to determine the depth of the object based on the blur quantification of each image and the varied camera settings for each image. The new DFD depth measurement results in a depth estimation of regions in the scene. Thus, the new DFD (depth) measurement may be for the entire image, or a portion (region) thereof.

Moving next to block 504, where the new measurements may be combined with previous measurements. In a first iteration, the previous measurements may be set to default values, nulled out, set to a first measurement, or the like. Combining measurements may be performed using a variety of techniques. In one non-limiting example, it may be assumed that the combination process remembers the output of the last combination, referred to herein as the Old Measurement.

Moreover, each of the New Measurement and the Old Measurement may be either ambiguous or non-ambiguous. An ambiguity may arise where an amount of blur for an object located in front of a focusing position and an amount of blur for the same object located behind the focusing position are determined to be the same. In this situation, combining the New Measurement and the Old Measurement may be dependent on which, if any of the New Measurement and Old Measurement is ambiguous. For instance, if the New Measurement is ambiguous and the Old Measurement is non-ambiguous, then the combined results may be set to the Old Measurement. Likewise, if the New Measurement is non-ambiguous and the New Measurement is ambiguous, then the combined results may be set to the New Measurement.

If both the New Measurement and Old Measurement are non-ambiguous and an absolute difference between the two measurements is less than a predefined threshold, then the combined result is set to that measurement with the greatest confidence level. However, if the absolute difference between the two measurements is greater than a predefined threshold and a confidence level of each measurement is greater than another predefined threshold, then it might not be possible to determine a depth estimation for these measurements because both the New and Old Measurements are of sufficient confidence, but are conflicting.

Moreover, if the New Measurement is ambiguous and the Old Measurement is also ambiguous, then a determination is made to find the depth estimations in the New and Old Measurements that are closest. If the two depth estimations are sufficiently close to each other (e.g., an absolute difference is less than a predefined threshold), then the combined result is defined as the mean of the two measurements. Otherwise, all the estimated depths are used as the combined measurement.

It should be noted that other techniques may also be used to combine measurements and are within the scope of the present invention. For example, it is possible to use all the DFD measurements that were previously derived, or any portion thereof.

In any event, upon completion of block 504, processing flows to decision block 506, where a determination is made whether depth estimation is not possible, and if not then the process ends; otherwise process 500 continues to decision block 508.

At decision block 508 it is determined whether the result is ambiguous, as discussed above, and if so, then processing branches to decision block 512; otherwise, process 500 continues to decision block 510.

At decision block 510, the confidence level of the result is compared with a predetermined threshold and, if the comparison is successful (the determined confidence level is at or above the threshold), processing is terminated and estimated depth map and corresponding confidence level results that are deemed reliable are output at block 514.

Otherwise, if at decision block 510, the confidence level of the result is below the threshold, then processing flows to decision block 512, where a determination is made whether additional measures are available for use. In some embodiments, availability may be determined based on a granularity of the camera settings discussed above. In some embodiments, the availability might be based on a total number of images already captured, a default setting for a total number of images to be used, or the like. In some embodiments, it might be determined that more images are to be captured for use in determining the estimated depth map for the scene. In such instances, where it is determined that more measurements are to be used to estimate the depth map, processing branches back to block 502; otherwise, processing may end.

Figure 6:
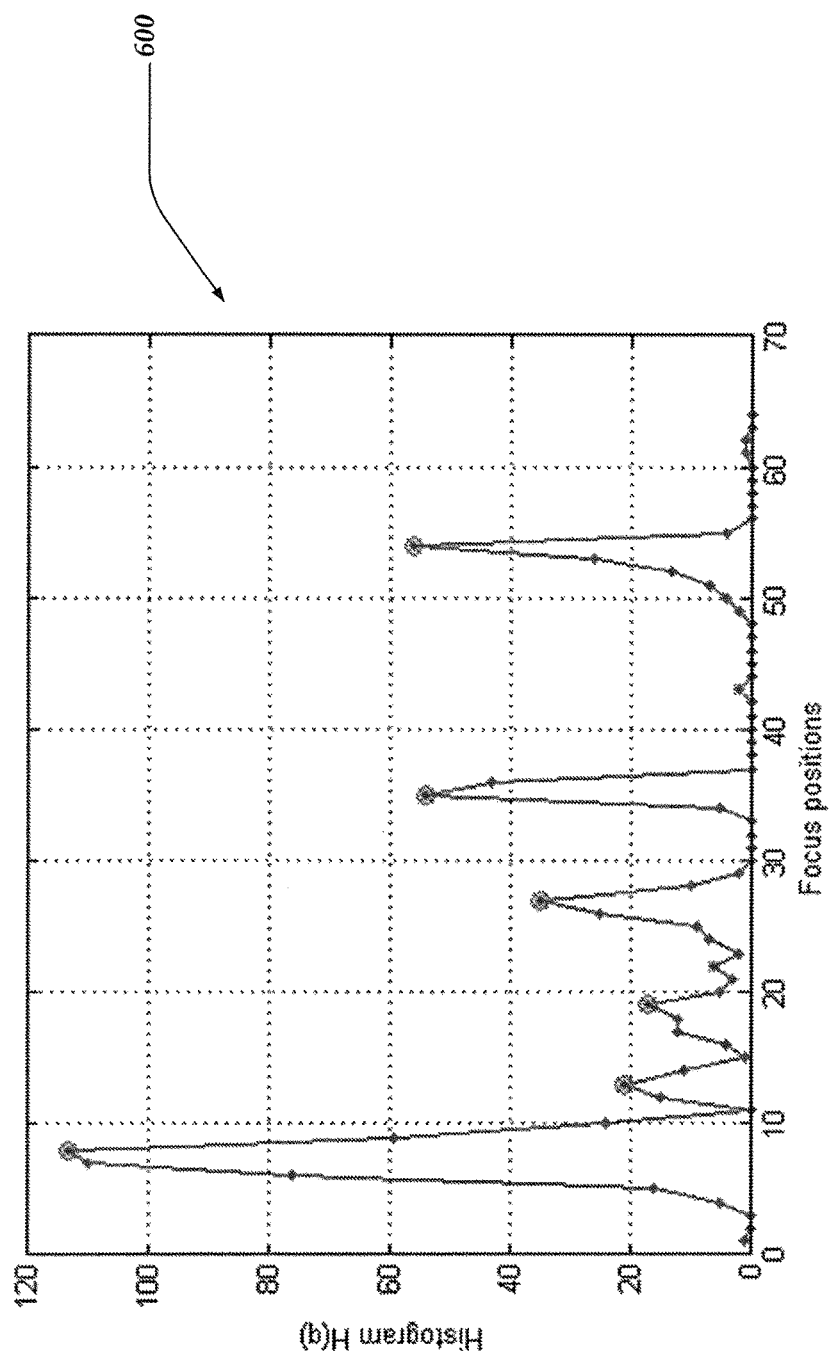
FIG. 6 illustrates one embodiment of a non-limiting, non-exhaustive example of a histogram usable to determine principle depths of a scene.

FIG. 6 illustrates one non-limiting, non-exhaustive example of a histogram that may be used at block 404 of FIG. 4 to determine the principle depths of the scene. Example 600 illustrates on an x-axis various focus positions selectable for capturing images, while a y-axis represents various values for a histogram function disclosed further below.

As noted above, given a depth map of a scene from block 402 of FIG. 4, principal depths in the scene may then be calculated. The following procedure provides one embodiment of a mechanism useable to find the principal depths based on scene areas that belong to a specific depth. Assume that the scene is divided into M×N rectangles, wherein each rectangle is a coordinate of the depth map and the depth map represents the depth of each rectangle. The depth map is denoted by D(x,y), where x=1 . . . M and y=1 . . . N. Also assume that the depth value falls within a one of a plurality of predefined depth bins. The number of depth bins is a finite positive integer, Q. Therefore, 1≤D(x,y)≤Q. Embodiments may calculate a histogram function H(q), for 1≤q≤Q, by using standard histogram techniques. For example, in one embodiment, H(q) may be determined by counting a number of entries, D(x,y) that have a specific q value.

Then, by sorting H(q) from the highest count to the smallest count, principle depths can be determined. In some embodiments, a predefined number P represents a number of principle depths to be found. Accordingly, the P principal depths are determined as being the q values for which H(q) has the P highest values. Alternatively, all peaks of the histogram function H(q) may be determined. Then the P principal depths are determined as being the q values for which P peaks have the H(q) highest values.

Referring to FIG. 6, an example histogram illustrates 64 depth bins. Each bin represents a depth, and is shown as the dots on the histogram. Six principal depths are determined. The P principal depths that belong to the biggest areas in the image are selected. In this example, there are six principal depths, shown as circled points in FIG. 6. P may be defined a priori as a fraction of Q, or P may be calculated based on the histogram H(q). For example, embodiments may choose P as the smallest number such that the sum of the P highest counts is higher or equal to half (or some other fraction) of the total number of rectangles in the depth map. That is, the smallest P such that $$\sum_{i=1}^{P} H(q_i) \geq 0.5 * M * N,$$

where H($q_i$) is the sorted histogram (highest value first).

In another embodiment, a different consideration for finding the principal depths takes into account significant areas in the image. For example, significant areas could be areas where faces, or other important objects, are detected during preview. Other important objects could be pets, cars, humans, or faces of specific persons recognized during the preview. The depths of the important objects, such as faces, should be included first in the list of the principal depths.

Different limitations may lead to different schemes for calculating the principal depths. For example, in cases of limited memory, the number of principal depths may be strictly limited by $P_o$, where $P_o$ is a maximum number of images. Then, the scheme for finding the principal depths may be changed according to this constraint so that in all cases the number of principal depths will be less than or equal to $P_o$.

It will be understood that figures, and combinations of blocks in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

What is claimed as new and desired to be protected by Letters Patent of the United States is:

1. A processor based method, comprising:
employing an image sensing device to receive a first set of two dimensional (2D) images;
employing one or more processors to perform actions, including:
generating a depth map for a scene, the scene comprising a plurality of pixels, each of the pixels corresponding to one of a plurality of depths in the depth map;
identifying a plurality of principal depths for the scene using the generated depth map, each of the principal depths having a number of corresponding pixels that is greater than a number of pixels corresponding to any non-principal depth of the depth map;
identifying a plurality of focus positions, the focus positions respectively corresponding to the principal depths;
capturing, using the image sensing device, a 2D image at each of the focus positions to form a second set of 2D images;
determining a depth correspondence between the second set of 2D images of the scene and the principal depths by associating each coordinate in the second set of 2D images with a principal depth that is closest to an actual depth of the coordinate; and
for each of a plurality of regions of interest in the scene, generating a three dimensional (3D) view including a right-eye image and a left-eye image by: i) selecting a corresponding principal depth for a respective region of interest, and ii) performing a translation and rotation transformation mapping for each pixel from a 2D image captured at the focus position for the principal depth for the respective region of interest.

2. The method of claim 1, wherein generating a depth map for a scene is based on a pre-capture of the first set of 2D images.

3. The method of claim 1, wherein the one or more processors perform actions, further including:
detecting an eye gaze of a user onto the scene, and employing the detected eye gaze to identify a region of interest within the scene; and
when the detected eye gaze is determined to change to another region within the scene, identifying another region of interest within the scene.

4. The method of claim 1, wherein a plurality of regions of interest is determined based on detecting positions of an input device within the scene.

5. The method of claim 1, wherein the principal depths are identified by:
dividing the depth map into M by N rectangles, where each rectangle is a coordinate of the depth map, and where a depth is represented by a corresponding focus position and a number of focus positions is a finite number;
generating a histogram function by counting entries depths having a specific value for each focus step; and
selecting from the histogram function a subset of peak values as the principal depths.

6. The method of claim 5, wherein the subset of peak values selected based on a number of rectangles in the depth map.

7. The method of claim 5, wherein the subset of peak values selected based on the number of focus positions.

8. The method of claim 1, wherein the depth map is determined from a depth from focus algorithm.

9. An image system, comprising:
an image sensing device configured to receive a first set of two dimensional (2D) images; and
one or more circuits having a plurality of components thereon and configured to perform a plurality of actions, including:
generating a depth map for a scene, the scene comprising a plurality of pixels, each of the pixels corresponding to one of a plurality of depths in the depth map;
identifying a plurality of principal depths for the scene using the generated depth map, each of the principal depths having a number of corresponding pixels that is greater than a number of pixels corresponding to any non-principal depth of the depth map;
identifying a plurality of focus positions, the focus positions respectively corresponding to the principal depths;
capturing, using the image sensing device, a 2D image at each of the focus positions to form a second set of 2D images;
determining a depth correspondence between the second set of 2D images of the scene and the principal depths by associating each coordinate in the second set of 2D images with a principal depth that is closest to an actual depth of the coordinate; and
for each of a plurality of regions of interest in the scene, generating a three dimensional (3D) view by: i) selecting a corresponding principal depth for a respective region of interest, and ii) performing a translation and rotation transformation mapping for each pixel from a 2D image captured at the focus position for the principal depth for the respective region of interest.

10. The image system of claim 9, wherein the one or more circuits are configured to perform actions, further including:
detecting an eye gaze of a user onto the scene, and employing the detected eye gaze to identify a region of interest within the scene; and
when the detected eye gaze is determined to change to another region within the scene, identifying another region of interest within the scene.

11. The image system of claim 9, wherein a plurality of regions of interest is determined based on detecting positions of an input device within the scene.

12. The image system of claim 9, wherein the principal depths are identified by:
dividing the depth map into M by N rectangles, where each rectangle is a coordinate of the depth map, and where a depth is represented by a corresponding focus position and a number of focus positions is a finite number;
generating a histogram function by counting entries depths having a specific value for each focus step; and
selecting from the histogram function a subset of peak values as the principal depths.

13. The image system of claim 12, wherein the subset of peak values is selected based on a number of rectangles in the depth map.

14. The image system of claim 12, wherein the subset of peak values is selected based on the number of focus positions.

15. The image system of claim 9, wherein the depth map is generated using a blur quantification of defocused images of the scene.

16. A storage device having stored thereon a plurality of computer-executable instructions that when executed by a digital camera, perform a plurality of actions, comprising:
generating a depth map for a scene, the scene comprising a plurality of pixels, each of the pixels corresponding to one of a plurality of depths in the depth map;
identifying a plurality of principal depths for the scene using the generated depth map, each of the principal depths having a number of corresponding pixels that is greater than a number of pixels corresponding to any non-principal depth of the depth map;
identifying a plurality of focus positions, the focus positions respectively corresponding to the principal depths;
capturing, using an image sensing device of the digital camera, a 2D image at each of the focus positions;
determining a depth correspondence between the 2D images of the scene and the principal depths by associating each coordinate in the 2D images with a principal depth that is closest to an actual depth of the coordinate; and
for each of a plurality of regions of interest in the scene, generating a three dimensional (3D) view by: i) selecting a corresponding principal depth for a respective region of interest, and ii) performing a translation and rotation transformation mapping for each pixel from a 2D image captured at the focus position for the principal depth for the respective region of interest.

17. The storage device of claim 16, wherein the instructions, when executed, cause the digital camera to perform actions, further including:
detecting an eye gaze of a user onto the scene, and employing the detected eye gaze to identify a region of interest within the scene; and
when the detected eye gaze is determined to change to another region within the scene, identifying another region of interest within the scene.

18. The storage device of claim 16, wherein a plurality of regions of interest is determined based on detecting positions of an input device within the scene.

19. The storage device of claim 16, wherein the principal depths are identified by:
dividing the depth map into M by N rectangles, where each rectangle is a coordinate of the depth map, and where a depth is represented by a corresponding focus position and a number of focus positions is a finite number;

generating a histogram function by counting entries depths having a specific value for each focus step; and selecting from the histogram function a subset of peak values as the principal depths.

20. The storage device of claim 16, wherein the subset of peak values is selected based on the number of focus positions.

21. The storage device of claim 16 wherein the subset of peak values is selected based on a number of rectangles in the depth map.

* * * * *